Feb. 19, 1957 — B. FERRAR — 2,781,828
ARMREST FOR STEERING GEAR
Filed Sept. 12, 1952
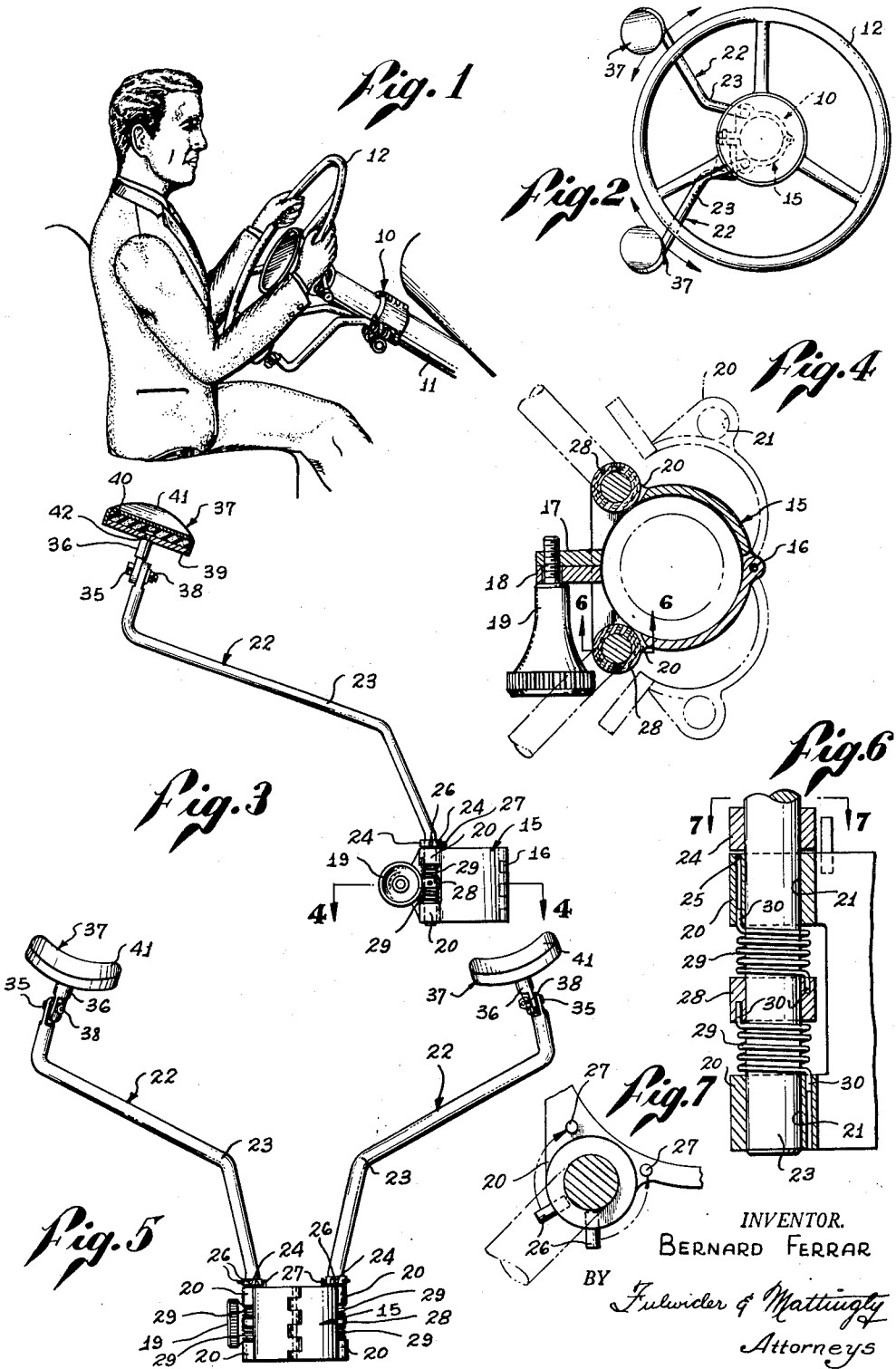
INVENTOR.
BERNARD FERRAR
BY Fulwider & Mattingly
Attorneys

United States Patent Office 2,781,828
Patented Feb. 19, 1957

2,781,828

ARMREST FOR STEERING GEAR

Bernard Ferrar, Los Angeles, Calif.

Application September 12, 1952, Serial No. 309,327

3 Claims. (Cl. 155—198)

My invention relates generally to an arm rest structure for use in combination with control wheels and the like, and more particularly, to an arm rest attachment adapted to be secured to the steering gear of an automobile to support the operator's arms while driving the vehicle.

In driving the conventional automobile, particularly over long stretches of highway having relatively few turns therein, the operator's arms tend to become tired from remaining for long periods in the same position, and there is a tendency to relax the hold on the wheel or to let go entirely with one hand. Such relaxation in the control of the steering wheel creates a road hazard, particularly in the event of a blowout or other emergency requiring a firm hand on the wheel. Various types of arm rest have been provided in the past in an attempt to support the operator's arm in a convenient position with respect to the wheel. Such for example, is an arm rest attached to the door on the driver's side of the vehicle on which one's elbow at least may be rested. Such devices have been far from satisfactory, however, for the reason that they tend to interfere with the operation of the steering wheel, particularly in emergency situations, and do not support both of the operator's arms in the most convenient and comfortable position for operating the wheel.

With a view to overcoming the disadvantages above noted, it is a major object of the present invention to provide an attachment for use with motor vehicles and the like, which the operator's arms may be conveniently and comfortably supported upon so as to avoid tiring the operator.

It is another object of the invention to provide an attachment of the class described which is movable with the steering wheel so as to provide support for the arms without interfering with their movements in turning the wheel.

It is still another object of the invention to provide an attachment of the class described which is adjustable to suit the bodily proportions and comfort of various operators.

It is a further object of the invention to provide an attachment of the class described which is readily attached to, or removed from the steering gear with which it is designed to be used.

The foregoing and additional objects and advantages of the invention will be apparent from the following detailed description thereof, such consideration being given likewise to the attached drawings, wherein:

Figure 1 is an elevational perspective view of the steering wheel and column of a motor vehicle with an attachment embodying the present invention secured thereon, showing an operator using the same;

Figure 2 is an oblique top view looking down along the axis of the steering column shown in Figure 1;

Figure 3 is a partially sectioned side elevational view of the attachment shown in Figure 2;

Figure 4 is a horizontal section taken on the line 4—4 in Figure 3;

Figure 5 is a rear elevational view of the attachment shown in Figure 1;

Figure 6 is an enlarged elevational section taken on the line 6—6 in Figure 4; and Figure 7 is a horizontal section taken on the line 7—7 in Figure 6.

Throughout the drawings, I have indicated the attachment embodying the present invention by the reference character 10. The attachment 10 is shown in Figure 1 in the operative position thereof in which it is secured by a clamp, to be described, to the steering column 11 of a conventional motor vehicle, in such position thereon as to place the arm rest portions of the attachment adjacent the steering wheel 12.

The attachment 10 includes an axially split clamp body 15, the two halves of which are hinged together at a rear hinge line 16 and have forwardly extending lugs 17 and 18 thereon to receive a knurled clamping screw 19 by which the clamp collar 15 may be secured to the steering column 11. The clamping collar 15 is preferably designed with a predetermined internal diameter to fit a particular model of automobile, but may be modified if desired by the use of conventional split bushings to fit other vehicles having smaller steering columns.

Each of the parts of the clamping collar 15 has formed on the forward exterior thereof, longitudinally aligned gudgeons 20 having aligned bearings 21 therein oriented on an axis parallel to the axis of the collar 15. A pair of arm rest assemblies 22 are supported on the clamping collar 15, one being received in each of the gudgeons 20. Inasmuch as the arm rest assemblies 22 are identical except for the fact that one is a left-hand construction and the other a right-hand construction, a description of one assembly will suffice.

Each of the assemblies 22 includes an arm 23, the lower end of which is received in the gudgeon bearings 21 for free swinging movement therein to carry the upper end of the arm 23 in a path generally parallel to the peripheral movement of the wheel 12. A thrust collar 24 is non-rotatably secured to each of the arms 23 and bears against the upper surface 25 of the upper gudgeon 20. Each collar 24 carries a radially extending pin 26 which limits the rotational movement of the arm 23 by striking against fixed vertical pins 27 secured in the upper edge of the clamp collar 15.

It is desirable that each of the arms 23 be yieldably constrained to a position midway between the limits of its swinging motion whereby the two arms at rest assume a predetermined angular relationship. To this end, a centering collar 28 is non-rotatably secured to the arm 23, midway between the gudgeons 20. A pair of torsion springs 29 are positioned on the arm 23 above and below the centering collar 28, stressed in opposite directions, and have their up- and down-turned ends 30 anchored in the centering collar 28 and in the gudgeons 20. The aggregate torque of the springs 29 is ample to return the arms to the centralized position shown in Figure 2, but is not sufficiently great to materially interfere with the operative movement of the arms hereinafter described. The centering collar 28, it will be noted, serves not only the centering function just described, but also acts in conjunction with the upper spring 29 as a keeper to prevent withdrawal of the arm 23 from the gudgeon bearings 21.

The arms 23 are bent upwardly and radially outwardly, as seen best in Figure 5, and at the upper ends are flattened to receive a transversely extending pivot bolt 35 which serves to secure the stem 36 of an arm rest pad 37 to the upper end of the arm 23. The stem 36 is in effect an extension of the arm 23. The clamping bolt 35 is oriented substantially parallel to a tangent of the periphery of the wheel 12, whereby to provide a tilting adjustment of the pad 37 by which it may be moved toward or away from the periphery of the wheel 12. When the pad 37 is adjusted to a position suiting the convenience and comfort of the operator, a nut 38 is tightened on the bolt 35, clamping the upper end of the arm 23 immovably against the stem 36 whereby to secure the pad 37 in its then adjusted attitude and position with respect to the arm 23.

The pad 37 comprises a base member 39 covered by a cushion 40 of sponge rubber or the like, and an outer covering 41 of leather or other upholstery material. The upper end of the stem 36 is shouldered at 42 and rotatably received in a central bore of the base member 39, the upper end of the stem 36 being riveted or otherwise treated to rotatably retain the base member 39 on the upper end of the stem 36. As seen best in Figure 5, the base members 39 and the cushions 40 thereon are curved upwardly to form a generally cylindrical cradle-like surface adapted to receive and comfortably support the forearm of the operator. Due to the rotatable connection between the stem 36 and the base member 39, the orientation of the pads 37 can be changed by the simple rotation of the pads 37 to suit the particular arm rest position desired by a particular operator.

The operation of the attachment embodying my invention should be apparent from the foregoing description thereof, it being noted that for minor movements of the wheel 12, such as are continuously made even on relatively straight highways and roads, the support arms 23 may swing with the wheel 12, thus obviating the necessity of the operator raising his arm from the arm rest to make such minor movements of the wheel. When it is desired to spin the wheel 12, as for example during maneuvering for parking and the like, the operator's arms will be lifted from the pads 37 and the arms 23, being returned to their central position by the springs 29, will not interfere with the spinning of the wheel 12. Also it should be noted that the centering movement always places the arms 23 in such position as to conveniently receive the operator's arms whenever it is desired to rest them thereon. I have found that an angle of approximately 90° between the arm rests provides a comfortable arrangement for most persons. Adjustment of this angle can be made by loosening the collar 28 on each arm and swinging the arms to the desired position.

Due to the simple attachment means comprising the clamp collar 15 and the clamping bolt 19, it is a very simple matter to remove the attachment 10 entirely or to change its vertical position on the column 11. The latter adjustment provides for a variation in arm position so as to prevent cramping and excessive tiring thereof over long driving periods.

While the device shown and described herein is fully capable of achieving the objects and providing the advantages hereinbefore stated, it will be realized that it is capable of some modification without departure from the spirit of the invention. For this reason, I do not mean to be limited to the form shown and described, but rather to the scope of the appended claims.

I claim:

1. An arm rest attachment for a steering column of a motor vehicle including: a clamp adapted to be secured to said steering column and formed with bearing means having its axis substantially parallel to, and closely adjacent the axis of said clamp; an arm positioned to extend upwardly and outwardly from said clamp, said arm having its lower end pivotally supported by said bearing means; an arm rest carried by the upper end of said arm; and a pair of axially disposed coil springs biasing said arm to a predetermined pivotal position with respect to said clamp, each of said springs having one end connected to said clamp and another end connected to said arm and being stressed in opposite directions.

2. An arm rest attachment for a steering gear of a motor vehicle including: a clamp adapted to be removably secured to a steering column and having a plurality of pivotal support members each comprising a pair of spaced bearings having common axes adapted to be substantially parallel to, and closely adjacent the axis of said clamp; a plurality of arms each positioned to extend upwardly and outwardly from said clamp, said arms having their lower ends pivotally supported by one of said pivotal support members; an arm rest pivotally carried by each of the upper ends of said arms for rotation with respect to said arms; an annular collar non-rotatably secured around each said lower arm end between said spaced bearings; and a pair of coaxial coil springs disposed around each said lower arm end and having opposite ends connected to adjacent bearings and adjacent ends connected to said collar.

3. An arm rest attachment for a steering gear of a motor vehicle including: a clamp adapted to be removably secured to a steering column and having a plurality of bearing means each comprising a pair of spaced bearings having coaxial bores adapted to be substantially parallel to, and closely adjacent the axis of said clamp; a plurality of arms each positioned to extend upwardly and outwardly from said clamp, said arms having their lower ends pivotally disposed in one of said bearing means; an arm rest carried by each of the upper ends of said arms for rotation about a substantially vertical axis with respect to said arms; an annular collar non-rotatably secured around each said lower arm end between said spaced bearings; a pair of coaxial coil springs disposed around each said lower arm end and having opposite ends connected to adjacent bearings and adjacent ends connected to said collar, and opposed shoulder means carried by each said arm and said clamp adapted to abut against each other to limit pivotal movement of each said arm.

References Cited in the file of this patent

UNITED STATES PATENTS

| 1,737,350 | Balcer | Nov. 26, 1929 |
| 2,200,700 | Monnia et al. | May 14, 1940 |
| 2,269,918 | Sill | Jan. 13, 1942 |
| 2,466,553 | McDonald | Apr. 5, 1949 |
| 2,491,009 | Lawrence | Dec. 13, 1949 |

FOREIGN PATENTS

| 433,063 | Germany | Aug. 20, 1926 |